Figure 3:
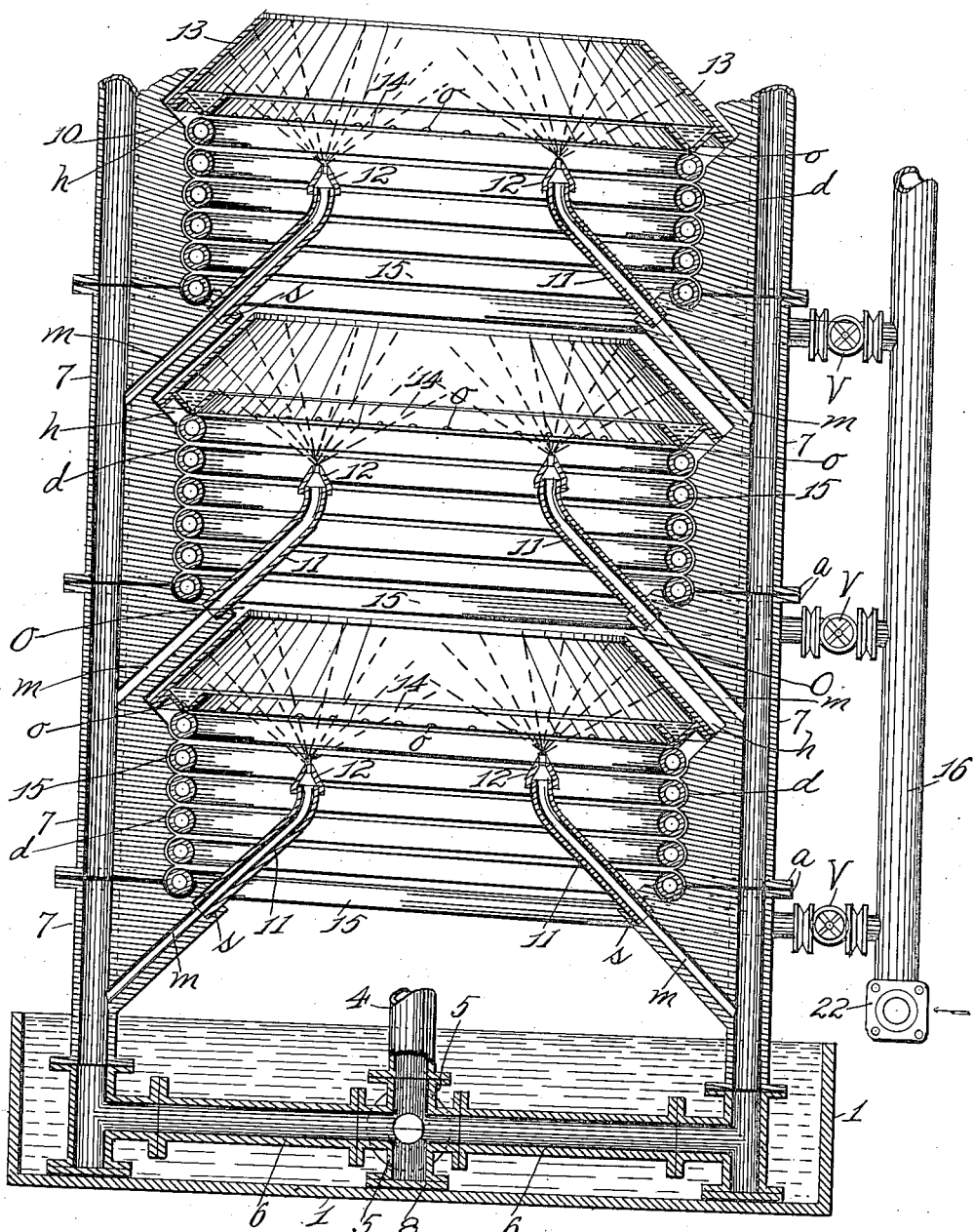

W. KOEDDING.
SURFACE CONDENSER.
APPLICATION FILED OCT. 20, 1920.
1,394,627.
Patented Oct. 25, 1921.
2 SHEETS—SHEET 1.
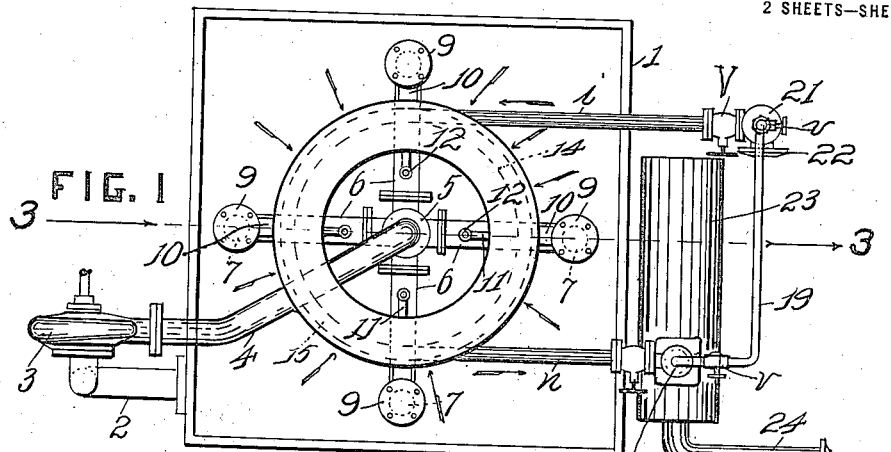
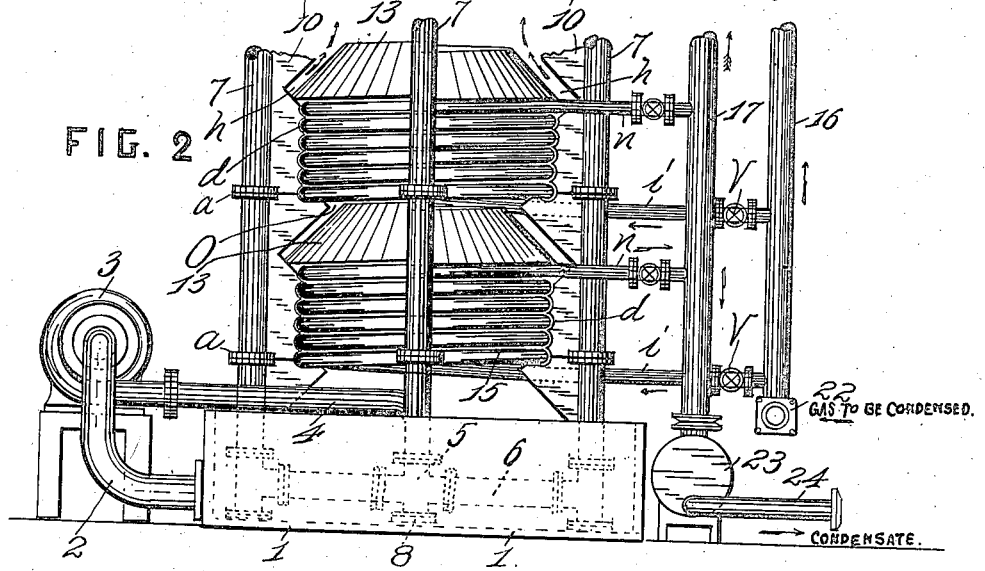
INVENTOR
William Koedding
BY
Emil Starek
ATTORNEY

UNITED STATES PATENT OFFICE.

WILLIAM KOEDDING, OF ST. LOUIS, MISSOURI.

SURFACE CONDENSER.

1,394,627.  Specification of Letters Patent.  Patented Oct. 25, 1921.

Application filed October 20, 1920. Serial No. 418,167.

*To all whom it may concern:*

Be it known that I, WILLIAM KOEDDING, a citizen of the United States, residing at St. Louis, State of Missouri, have invented certain new and useful Improvements in Surface Condensers, of which the following is a full, clear, and exact description, reference being had to the accompanying drawings, forming a part hereof.

The present invention is directed to improvements in surface condensers (for gases and vapors), particularly of the cooling-tower type in which a plurality of circulating condenser units are simultaneously exposed to the cooling influence of air currents charged with cooling liquid (preferably water) in the form of spray, the said currents operating not only to carry the liquid spray to the exposed surfaces of the condenser units, but at the same time to cool, or reduce the temperature of the spray to a point where it will effect a maximum condensation of the gas or vapor circulating through the condenser units. A further object is to provide a structure in which the currents of air serving as a vehicle for the cooled spray particles are induced to flow toward the surfaces of the condenser units by the action of the spray jets, the prescribed paths for the air currents being determined by a series of deflectors against the opposite faces of which the air and spray jets respectively initially impinge, the surfaces of impact of said deflectors being so disposed relatively to the axis of the tower as to cause the moisture-laden currents to flow through the tower in a direction substantially parallel to said axis, and with uniform contact against the cooling surfaces of the several condenser units. A further object is to return the cooling liquid (water) to its original source of supply after it has discharged its function as a condensing medium, provision being made in the form of a circulating pump to use the same body of liquid over and over again for condensing purposes, any part that may be lost by evaporation or leakage being restored to the original body of liquid either by hand or automatically by any suitable form of float valve operating to maintain a contant level of the liquid or water in the reservoir or basin in which the same is stored. A further object is to provide means for collecting the spray particles of the cooling water (or other liquid) and subsequently allowing the same to trickle over the condensing surfaces of the condenser units substantially in sheet form, thus exposing the cooling water to the air to the best advantage, any evaporation incident to such exposure resulting in a further reduction of temperature of the water and in a corresponding cooling of the condenser walls over which the water flows, and hence in a further condensation of the vapors or gases circulating through the condenser units. Among the advantages inherent in the improved structure may be mentioned, the reduced initial cost of installation; reduction of available space for operation; reduced handling of the water by which the cooling and condensing is effected; the combining of cooling and condensing functions in a single apparatus; the purging of the system of non-condensable gases; rapid condensation of vapors and condensable gases; and various other advantages to be more fully apparent from the following detailed description in connection with the accompanying drawings in which—

Figure 1 represents a top plan of the condenser; Fig. 2 is a front elevation thereof; and Fig. 3 is an enlarged vertical section on the line 3—3 of Fig. 1, parts being broken away.

Referring to the drawings, 1 represents a storage basin or reservoir for water, the vertical wall of the reservoir being tapped near the bottom by a pipe 2 serving as an intake for any conventional form of circulating or centrifugal pump 3, the discharge pipe 4 leading therefrom being coupled to the upper flanged end of the central tubular hub 5 of a distributing spider deposited on the bottom of the basin 1, the hollow arms or pipes 6 of the spider radiating outwardly toward the walls of the basin, the outer ends of the spider arms being coupled inside the basin to the lower terminals of a series of stand pipes 7 preferably composed of a plurality of flanged sections as shown, the several pipe sections being secured to one another at the flanges in any suitable manner as clearly obvious from the drawings. The bottom of the spider hub 5 is closed by a plate 8, and the upper ends of the stand pipes 7 are closed by the plates 9 as shown, to properly confine the circulation of the cooling medium as will hereinafter more fully appear. Formed with the peripheral walls of each stand-pipe section between the terminal flanges a, a, thereof is a web or wing 10 the pipe sections being so turned when being assembled as to bring the webs of the several sections into a common vertical plane, the webs of the several stand-pipes converging radially toward a common vertical axis coincident with the axis of the spider hub 5 (Fig. 1). The upper portion of each web is formed with a V-shaped recess h for a purpose presently to appear, the edge of the web below said recess being notched or serrated so as to form a series of substantially semicircular depressions d as shown. Formed in each web 10, and inclined to the bore of the stand-pipe 7 (or pipe section carrying said web), and substantially parallel to the upper inclined edge of the recess h and communicating with the bore of the stand-pipe, is a passage-way or duct m terminating at the outer end in an enlargement or socket s for receiving the lower end of a pipe or nozzle 11, the bore of the nozzle being continuous with the passage-way m and maintained at substantially the same inclination therewith, the discharge end of the nozzle terminating in a conical spray-head or tip 12 as shown, the axis of the discharge opening of the spray-head being substantially vertical (Fig. 3). Resting on, or supported by, the lower inwardly and downwardly inclined edges of the V-shaped recesses h of the webs clustered about the vertical axis of the spider from which the several stand-pipes 7 lead, is a conical deflector or shield 13, the same being provided on the inside with a bottom collecting basin or trough 14 substantially V-shaped in cross-section the bottom of the trough being provided with a series of perforations or discharge openings o for the escape of the water collecting in said trough from the intercepted spray projected from the spray heads 12 and impinging against the inner faces of the walls of the deflector. Disposed beneath each trough 14 and supported by the semi-circular walls of the depressions d of the serrated portions of the webs 10, is the helical circulating coil 15, the intakes i of the several coils being connected to the gas or vapor supply pipe or feed header 16, the outlet or discharge branches n being connected to the vertical outlet header or stand-pipe 17 as shown. The upper end of the header 17 terminates in a dome 18 from which leads a horizontal valve-controlled pipe 19 discharging into a short vertical pipe 20 which communicates with a gas collecting chamber 21 at the upper end of the header 16, the pipes 19, 20, serving to equalize the pressure between the members 18, 21. The pipe 20 is provided with a valve v, the end of the pipe above the valve being adapted to be coupled to any suitable form of exhauster or vacuum pump (not shown)
to draw off any non-condensable gases ac-
cumulating in the gas chamber 21. The lower end of the pipe 16 terminates in a flange 22 for attaching to any suitable main conducting the gas or vapor to be condensed from any suitable source (not shown). The lower end of the outlet stand-pipe 17 discharges into a hot well or drum 23 in which the condensate is collected, an outlet pipe 24 leading from the drum being adapted to be coupled to any system of pipes (not shown) for returning the condensate to its original source, or to any other point of consumption or use. The several pipes where needed, are provided with any conventional or convenient form of valve V as shown for controlling the flow of the gases or liquids therethrough as the case may be. Each circulating coil 15 forms a condenser unit, the several units supported over one another between the four stand-pipes 7, forming collectively a cylindrical tower, successive units or sections of said tower being separated from one another by an intermediate conical deflector 13, the inclined walls of which leave a sufficient annular clearance or space O between them and the next unit above, for the free influx of atmospheric air into the interior of the tower from points above the bottom or lowermost unit, air being free to enter the tower below this unit as clearly obvious from the drawings (Fig. 3).

The operation of the system is substantially as follows: The pump 3 having been set into operation draws the water (or other liquid) from the tank or basin 1 through the pipe 2 forcing the same into the stand-pipes 7 which it fills to the top, a moderate pressure being maintained in the pipes to force the water through the passages m of the webs 10, through the nozzles 11 and spray heads 12, the latter projecting the fine particles of water upward in the tower, a considerable portion of the spray impinging against and being intercepted by the inclined walls of the conical deflectors 13 which are well within the range of the spray particles projected from said heads. The spray jets induce a strong flow of atmospheric air toward the tower, some of the induced air currents flowing into the tower from points below the lowermost condenser unit, and other currents converging radially toward the tower from points above said unit and impinging against the outer faces of the walls of the several conical deflectors by which they are deflected upwardly and caused to pass into the tower through the annular clearance spaces O (see arrows Figs. 1, 2). These rising currents of air in contact with the fine particles of spray, bring about a certain amount of evaporation of the water particles (said amount depending of course on the temperature and humidity of the air at the time), said evaporation cooling, or lowering the temperature of the portions of the water particles not evaporated, as well understood in the science of physics. The result is that there is produced a rising column of moisture-laden air charged to a considerable extent with water particles that have been considerably cooled, this column flowing over the exposed surfaces of the condenser units and causing a condensation of the vapors or gases circulating through or traversing said units. Another portion of the cooled spray (in fact the major portion) or that intercepted by the deflectors 13 is precipitated or caused to flow into and collect in the annular troughs 14 whence it escapes through the openings o and trickles down over the exposed surfaces of the several condenser units substantially in sheet form, the water finally dropping from the condensing surfaces of the bottom unit back into the tank or basin 1. It follows therefore that the outer surfaces of the condenser units are exposed simultaneously to the cooling influences of an ascending moisture-laden column of air and a descending sheet of water, the two together contributing to effect a maximum condensation of the gases or vapors circulating through the condenser units. Obviously some water will be lost by evaporation and in the air column escaping through the top of the tower, so that the basin 1 must be kept replenished either by hand or automatically by any suitable float or equivalent valve (not shown) keeping the water in the basin at a constant level as well understood in the art. It will be observed (Fig. 3) that the water dripping from any unit above the bottom unit falls across the annular clearance O onto the inclined walls of the conical deflector immediately beneath it, whence it drips directly into the tank 1 without flowing over any unit below in the series, it being understood that the bottom edge of each deflector overhangs or is sufficiently removed radially from the next unit below to prevent the water which has been heated in its passage over any unit and dropping onto a deflector from subsequently flowing over the next or any lower unit, the object being that each unit shall have its own complement of cool water to flow over it. In other words, the water which becomes heated after cooling any unit is discarded and returned directly to the tank 1. As the water drips across the clearance O (and in fact while flowing down the inclined walls of the deflectors 13) it encounters the inrushing currents of air flowing toward and into the tower under the inducing action of the spray jets (see arrows Fig. 1), and by coming in contact with these currents a further cooling of the water takes place thereby imparting to the present system a maximum condensing efficiency. The gases or vapors to be condensed after entering the header 16 (from their original source) circulate through the coil intakes i, thence through the coils 15, and from the coils through the outlet or discharge branches n into the header 17, the condensed vapors flowing into the hot well or drum 23. Any non-condensable gases accumulating in the chamber 21 are removed by any suitable form of exhauster (not shown) attached to the pipe 20 beyond the valve v as already described.

Obviously, a cylindrical atmospheric cooling tower built up by a succession of cylindrical condenser units with spiral circulating paths for the gases is the easiest to construct. In such a tower a conical deflector such as 13 would be the natural thing. But I do not wish to be limited to cylindrical towers, a tower of polygonal, elliptical, or other form of cross section with a corresponding change in the form of deflector coming within the scope of my invention. The structure shown may be changed in many details without departing from the nature or spirit of the invention.

Having described my invention what I claim is:

1. In combination with a surface condenser, a liquid spraying member positioned in proximity thereto and operating to induce a flow of atmospheric air toward the condenser and into the path of projection of the sprayed particles for cooling the latter, a deflector for intercepting the cooled liquid particles, means for collecting the particles so intercepted, and means for discharging the cooled liquid over the surface of the condenser.

2. In combination with a surface condenser provided with a helical path for the circulation of a gas or vapor to be condensed, means encompassed by the helix for spraying a vaporizable liquid in a direction operating to induce a flow of atmospheric air toward the condenser and into the path of the projected spray particles, a deflector positioned to intercept the spray, means for collecting the spray so intercepted, and means for discharging the collected liquid and causing the same to flow over the outer surface of the condenser.

3. In a condensing system of the character described, a plurality of helical circulating condenser units disposed in tower form, a source of water supply, a plurality of jet nozzles disposed inside the tower and connected to said water supply source, means for forcing the water through the nozzles in spray form whereby currents of atmospheric air are induced to flow radially toward the tower and into the path of projection of the spray, a series of superposed deflectors in the path of the moisture-laden air currents operating to intercept the spray particles, means for collecting the intercepted particles, and means for distributing the water thus collected over the surfaces of the condenser units and causing its return to its original supply source.

4. In combination with a condenser member, means for causing currents of moisture-laden gases to traverse the surface thereof in one direction, means for intercepting the liquid particles at a suitable point in said traverse and causing the liquid so intercepted to flow over the condenser surface in the opposite direction.

5. In combination with a condenser member, means for causing currents of air laden with particles of water spray to pass over the condenser surface in one direction, and means for separating the water particles from the air currents at a suitable point and causing the same to pass over the condenser surface in the opposite direction.

6. In combination with a condenser member, means for passing over the surface thereof in one direction currents of air laden with fine particles of vaporizable liquid, means for separating the liquid particles from said air currents and collecting the same, and means for causing the collected liquid to flow over the condenser surface in the opposite direction.

7. A cooling tower condenser comprising a series of condenser units spaced apart, stand-pipes for supporting the same, deflectors interposed between successive units and spaced from one of the units, a source of cooling liquid supply, and means for spraying said liquid in the tower in proper direction to induce a flow of atmospheric air into the tower through the spaces around the deflectors for mingling with the spray and cooling the same.

8. A cooling tower condenser comprising a series of stand-pipes disposed about a fixed vertical axis and at equal distances therefrom, a series of helical condenser units superposed over one another and spaced apart supported from said stand-pipes, conical deflectors between successive condenser units, the walls of each deflector being separated by a clearance from the condenser unit immediately above, spray nozzles leading from the stand pipes into the tower to points within range of the series of deflectors, troughs adjacent the bases of the inner faces of the walls of the deflectors positioned over the condenser units and perforated to discharge the water thereon to cool the same, a source of water supply, and means for forcing the water from said supply source into the stand pipes and through the spray nozzles.

9. A cooling tower condenser comprising a series of vertical stand pipes disposed at equal distances from a fixed vertical axis, a succession of superposed helical condenser units spaced vertically apart confined between said stand pipes, suitable web formations on the stand pipes for supporting said units, said formations being provided with passageways communicating with the bores of the stand pipes, conical deflectors interposed between successive condenser units and supported by the web formations aforesaid, the walls of the deflectors converging upward toward the central vertical axis of the tower and being spaced from the units immediately above the deflectors, annular collecting troughs disposed on the inside of the deflectors adjacent to the lower edges thereof and immediately over the condenser units, the bottoms of the troughs being perforated to permit the water to discharge onto the condenser units, spray nozzles leading from the passage-ways of the web formations into the tower and discharging the spray jets against the inner faces of the walls of the deflectors, a tank or basin at the bottom of the tower for catching the water flowing over the condenser units, a circulating pump for forcing the water from the tank into the stand pipes and through the spray nozzles, and means for causing a circulation of the vapors or gases to be condensed through the condenser units.

10. In a condenser of the character described, a circulating condenser unit for the gas or vapor to be condensed, a feed header and an outlet header, a gas collecting chamber at the top of the feed header, a pressure equalizer pipe connection between said chamber and outlet header, and a drum or hot well at the bottom of the outlet header.

11. In a tower condenser, a basin, a hollow spider in said basin, stand pipes leading from the outer terminals of the spider arms, a central hollow hub from which the spider arms radiate, a circulating pump connected respectively to the basin and to the hub of the spider, and nozzles leading from the stand pipes.

12. In combination with a plurality of condenser units disposed over one another and spaced apart, deflectors having outwardly and downwardly sloping walls interposed between the units, the bottom edges of the deflectors overhanging the units immediately beneath, means for directing jets of water against the inner faces of the deflector walls, means for collecting the particles of water intercepted by the deflectors and causing the same to flow over the condenser units, the water dropping from any unit onto a deflector immediately beneath, leaving said deflector without flowing over any condenser unit lower down in the series.

In testimony whereof I affix my signature in presence of two witnesses.

WILLIAM KOEDDING.

Witnesses:
EMIL STAREK,
C. H. CALLON.